UNITED STATES PATENT OFFICE.

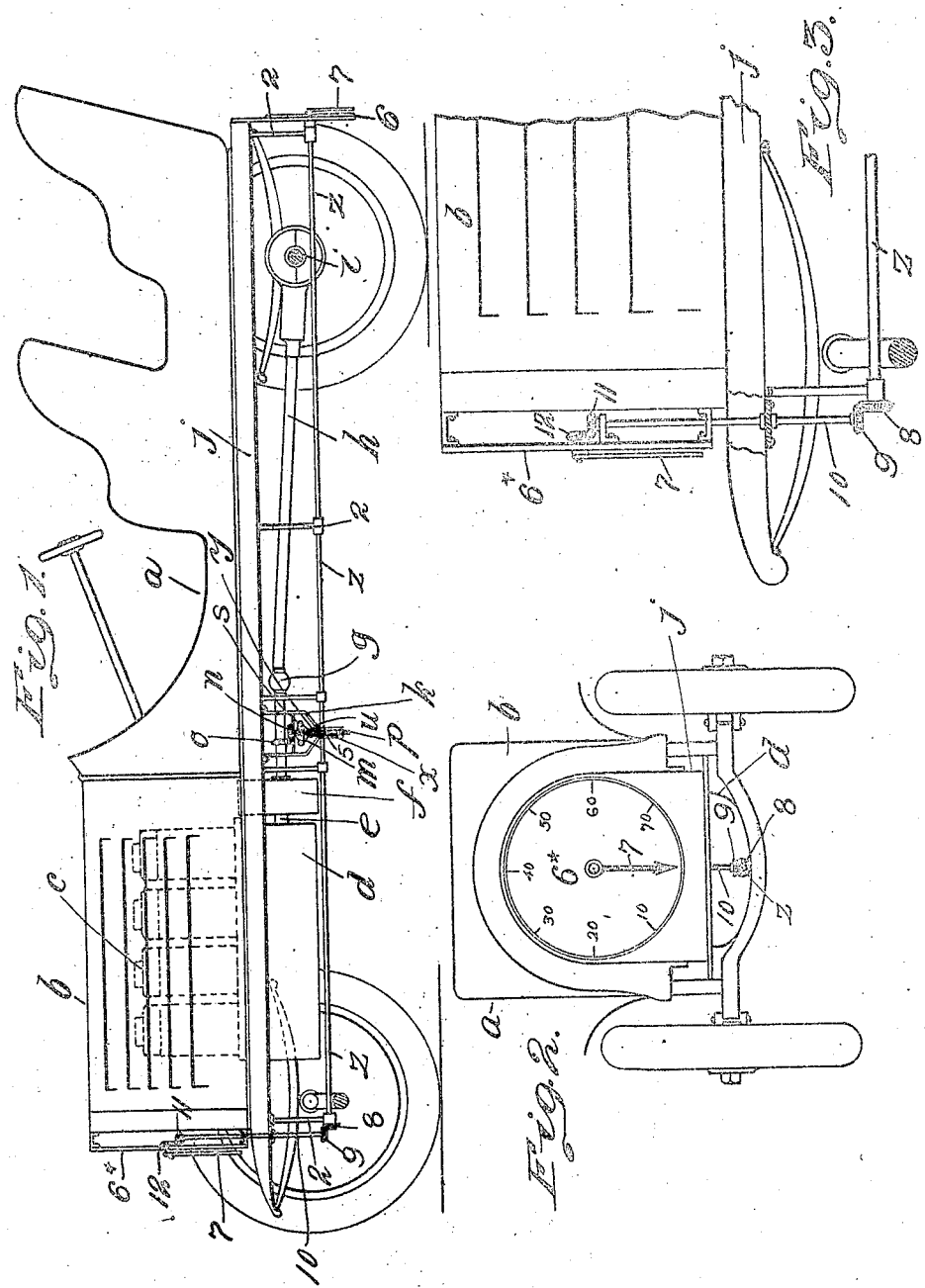

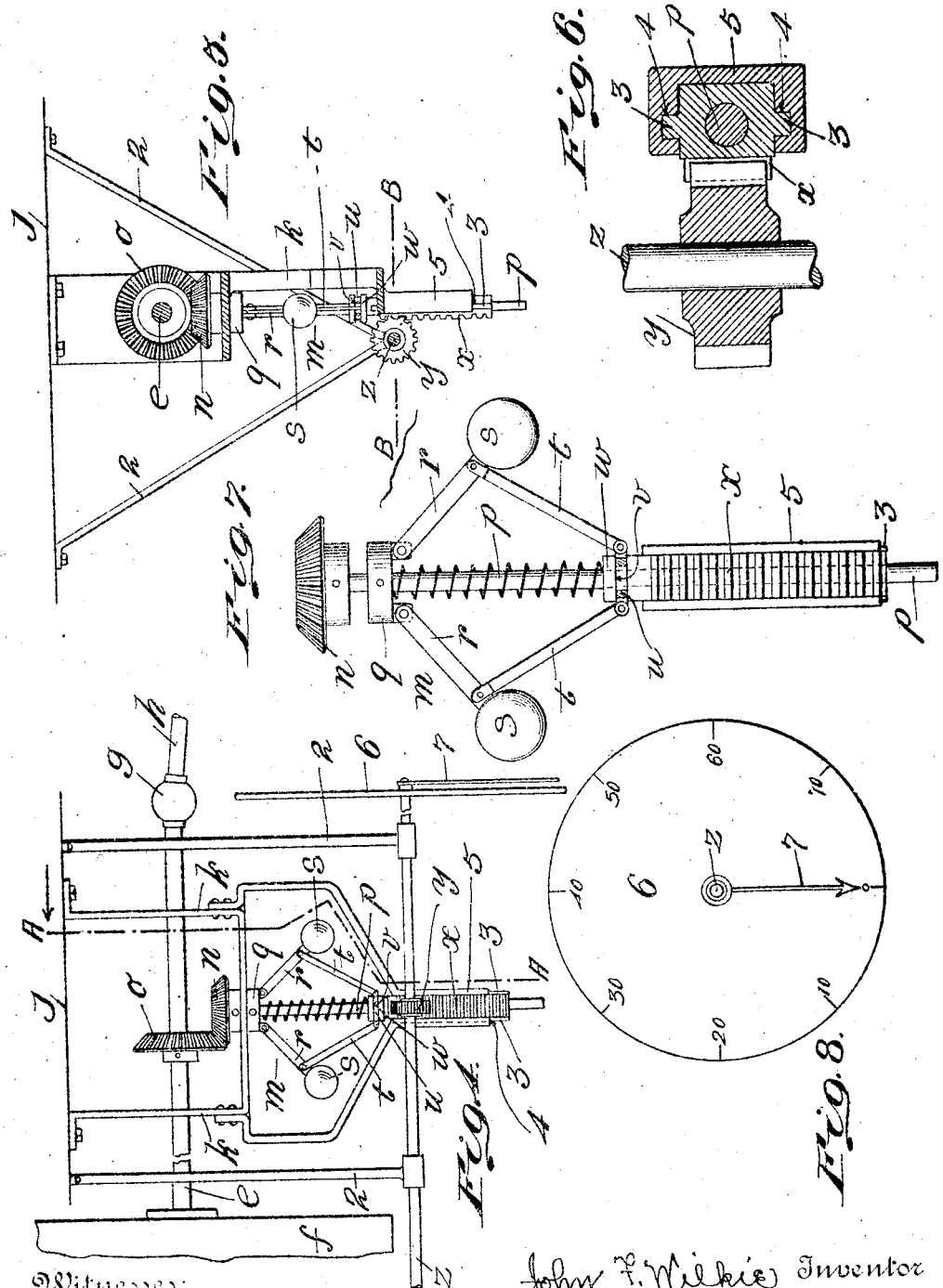

JOHN F. WILKIE, OF HIBBING, MINNESOTA.

SPEEDOMETER.

989,742.

Specification of Letters Patent.   Patented Apr. 18, 1911.

Application filed October 23, 1909. Serial No. 524,104.

*To all whom it may concern:*

Be it known that I, JOHN F. WILKIE, a citizen of the United States, residing at Hibbing, in the county of St. Louis and State of Minnesota, have invented certain new and useful Improvements in Speedometers, of which the following is a specification, reference being had to the accompanying drawings.

My invention relates to speed-indicating devices and particularly to speed-indicating devices for self-propelled vehicles, such as automobiles; and an object of my invention is to provide a device of the character described which will be simple in construction, comparatively cheap in manufacture and first cost of installation and most efficient in use and which will indicate to the authorities and to the general public the speed at which the vehicle is moving at any time.

In the drawings illustrating the principle of my invention and the best mode now known to me of applying that principle, Figure 1 is a side elevation of an automobile, partly in section, embodying my invention; Fig. 2 is a front view of the same; Fig. 3 is a detail of the connection with the front indicator; Fig. 4 is a detail of the connection between the power-transmitting or driving shaft and the speed-indicating mechanism; Fig. 5 is a section on the line A—A of Fig. 4; Fig. 6 is a detail section taken on the line B—B of Fig. 5; Fig. 7 is a detail of the governor mechanism; and Fig. 8 is a detail of the dial.

The body $a$ of the automobile is provided at its front end with the usual engine-casing $b$ in which are housed the engines $c$. The latter are protected from the mud and dust of the roadway by the usual canvas-like shield or tarpaulin $d$. The engines $c$ drive the shaft $e$ upon which is mounted the usual fly-wheel $f$ and which is connected by the universal joint $g$ to the transmission shaft $h$ that propels the vehicle through the gears (not shown) which connect the rear axle $i$ with the shaft $h$. The parts so far described are now and have long been in common use in automobile construction.

To the bottom of the chassis $j$ of the automobile is fastened a casing $k$ in which is housed a ball-governor $m$ provided with a bevel-gear $n$ which meshes with and is driven by the bevel-gear $o$ upon the engine-shaft $e$. The bevel gear $n$ is fast upon the upper end of the governor-spindle $p$ the lower end of which is mounted in a suitable bearing in the bottom of the casing $k$ and which carries a fast collar $q$ to which are attached the upper toggle-links $r$ that carry the balls $s$ and are connected by the lower toggle-links $t$ to a ring $u$. The latter is slidably fitted in the groove $v$ formed circumferentially in the loose collar $w$ integral with which is a rack $x$ that is in mesh with and drives a pinion $y$ fast upon the indicator shaft $z$. The latter extends from end to end of the automobile and is journaled in the hangers 2 fastened to the chassis $j$ at their upper ends. The rack $x$ is formed with ribs 3 which fit in guideways 4 in a plate 5 which is carried by and really forms a part of the casing $k$.

To the rear end of the automobile is fastened a suitably-inscribed dial-plate 6 through the center of which projects the rear end of the indicator-shaft $z$ carrying the index-hand 7 that travels over the face of the dial-plate 6 and indicates in conjunction therewith the speed of the vehicle. To the front end of the indicator-shaft $z$ is fastened a bevel-gear 8 which through the bevel-gear 9 drives the vertical shaft 10 that in turn through the gears 11, 12 rotates the index hand 7 which travels over the face of the dial-plate 6* mounted on the front of the engine-casing $b$.

The operation of my new speed-indicating device will now be readily understood from the foregoing description taken in connection with the accompanying drawings. As the speed of the automobile increases, the governor-balls $s$ fly outwardly, as will be readily understood by all knowing the principle upon which ball-governors operate. The outward movement of the governor-balls $s$ causes an upward movement of the ring $u$ and, through the latter, of the loose collar $w$ and the rack $x$. Movement of the latter causes, through the pinion $y$, rotation of the indicator-shaft $z$ and of its connected index-hands 7 over the dials 6 and 6*.

A policeman or any other observer is by means of my new indicating apparatus enabled to discover the speed of the road vehicle provided with the apparatus.

I claim:

In a self-propelled vehicle, the combination of a vehicle-body; a driving mechanism for propelling the same; an indicator-shaft which extends from end to end of and is carried by said vehicle-body; a governor mechanism which is driven by said driving mechanism and which drives said indicator-shaft; a pair of dials one of which is mounted at the front of said vehicle-body and the other of which is mounted at the rear of the same; and a pair of index hands, one for each of said dials; said index hands being moved over said dials by the turning of said indicator-shaft in response to the movements of said governor mechanism and said dials being mounted in plain view from outside of said vehicle-body.

JOHN F. WILKIE.

Witnesses:
G. A. WELLNER,
HERMAN KOHET.